US010723079B2

(12) United States Patent
Messner

(10) Patent No.: US 10,723,079 B2
(45) Date of Patent: Jul. 28, 2020

(54) FAST, EFFICIENT DIRECT SLICING METHOD FOR LATTICE STRUCTURES

(71) Applicant: Lawrence Livermore National Security, LLC, Livermore, CA (US)

(72) Inventor: Mark Christian Messner, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 221 days.

(21) Appl. No.: 15/683,953

(22) Filed: Aug. 23, 2017

(65) Prior Publication Data

US 2019/0061269 A1    Feb. 28, 2019

(51) Int. Cl.
| | |
|---|---|
| *B33Y 50/02* | (2015.01) |
| *B29C 64/40* | (2017.01) |
| *B33Y 50/00* | (2015.01) |
| *G06F 30/23* | (2020.01) |
| *G06F 30/17* | (2020.01) |

(52) U.S. Cl.
CPC ............. *B29C 64/40* (2017.08); *B33Y 50/00* (2014.12); *B33Y 50/02* (2014.12); *G06F 30/23* (2020.01); *G06F 30/17* (2020.01)

(58) Field of Classification Search
CPC ......... B29C 64/40; B33Y 50/00; B33Y 50/02; G06F 17/5086
See application file for complete search history.

(56) References Cited

U.S. PATENT DOCUMENTS

| | | | |
|---|---|---|---|
| 2017/0277168 A1* | 9/2017 | Tanaka | G05B 19/4099 |
| 2018/0056604 A1* | 3/2018 | Sands | B29C 64/135 |
| 2018/0144219 A1* | 5/2018 | Kalisman | B33Y 50/00 |
| 2018/0240263 A1* | 8/2018 | Courter | G06T 15/08 |

FOREIGN PATENT DOCUMENTS

WO    WO-2018031904 A1 *    2/2018    ......... G06F 17/5009

OTHER PUBLICATIONS

Messner, Mark C., "A fast, efficient direct slicing method for slender member structures", Oct. 6, 2016, 18 pages.
Guduri, Sashidhar et al., "A Method to Generate Exact Contour Files for Solid Freeform Fabrication", pp. 95-101.
(Continued)

*Primary Examiner* — Michael J Huntley
(74) *Attorney, Agent, or Firm* — Harness, Dickey & Pierce, PLC

(57) ABSTRACT

The apparatus generates slices of slender member structures for additive manufacturing of object using a processor having associated non-transitory memory. The memory is programmed to define a graph data structure for storing data representing a plurality of elongated struts each having a predefined spatial position and orientation relative to a three-dimensional reference frame. The memory is further programmed to define a slice data structure for storing data representing spaced apart and parallel two-dimensional slices each passing through the three-dimensional reference frame, the slice data structure storing for each slice a grid comprising a plurality of pixels, each pixel representing a binary state indicating whether material is or is not added in performing additive manufacturing of an object.

19 Claims, 6 Drawing Sheets

(56) References Cited

OTHER PUBLICATIONS

Chen, X. et al., "Direct Sliding from PowerSHAPE Models for Rapid Prototyping", The International Journal of Advanced Manufacturing Technology, 2001, pp. 543-547.
Cao, W., et al., "Direct Slicing from AutoCAD Solid Models for Rapid Prototyping", The International Journal of Advanced Manufacturing Technology, 2003, pp. 739-742.
Starly, B., et al., "Direct sliding of STEP based NURBS models for layered manufacturing", Computer-Aided Design 37, 2005, pp. 387-397.
Sun, S.H., et al., "Adaptive direct sliding of a commercial CAD model for use in rapid prototyping" Int J Adv Manuf Technol, 2007, pp. 689-710.

* cited by examiner

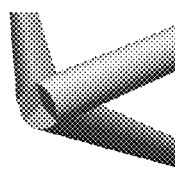 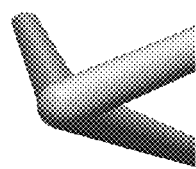
Fig. 4a　　　　Fig. 4b
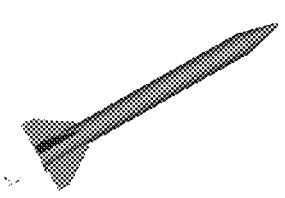 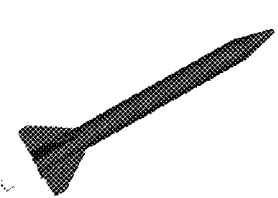 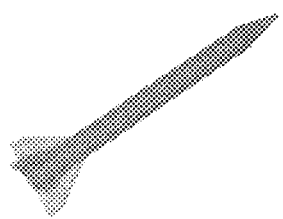
Fig. 5a　　　Fig. 5b　　　Fig. 5c slice direction

FAST, EFFICIENT DIRECT SLICING METHOD FOR LATTICE STRUCTURES

FIELD

The disclosure relates generally to additive manufacturing. More particularly the disclosure relates to additive manufacturing of lattice structures comprised of many intersecting struts. The disclosure describes an apparatus and method that produces slices of 3D models that drive the additive manufacturing material deposition process. The slices are generated by processor-implemented ray tracing.

BACKGROUND

In conventional additive manufacturing, also known as 3D printing, material is deposited a layer at a time using a material deposition tool or print head that selectively deposits material as it moves across a processor-controlled two-dimensional path, referred to as a slice. The processor is typically programmed to move the tool or head in a raster (back and forth) grid path, and commands the tool to deposit material when the tool or head is positioned at designated locations along the raster path. The process repeats, layer upon layer until the additive manufactured part is complete.

In a typical case, the part to be manufactured will be represented with a 3D model consisting of operations (for example union, difference, and intersection) combining primitive shapes into a solid geometry. Slices of these types of 3D models result in collections of relatively simple shapes on a plane. For example, a hollow globe might be designed as comprising layers of concentric circles whose radii gradually increase from the south pole to the equator and then gradually decrease from the equator to the north pole. A solid sphere would be manufactured in a similar fashion, except that the interiors of the concentric circles would be filled with material. In typical applications the number of primitive shapes in the 3D model and the 2D slices are fairly limited, perhaps less than 10,000 primitives even for a complicated part. Creating an additive manufactured part for these kinds of parts is straightforward and requires modest computational resources.

While parts manufactured from simple shapes are sometimes adequate, there are applications when more sophisticated material properties are needed to achieve a part that is stronger, lighter, or exhibits anisotropic properties that differ from its counterpart made from primitive shapes. In such instances, it may be desirable to define the part as a lattice comprising a plurality of intersecting struts. By way of illustration, FIG. 1 shows how a cube might be defined as a lattice of intersecting struts.

As FIG. 1 shows, in the general case, the struts are not necessarily disposed in common planes, as one might construct a log cabin. Rather the longitudinal vector directions of the struts can be quite different from one another. By way of example, illustrated at 12, the cube 10 is defined as a random tetrahedral structure. In contrast, the cube illustrated at 14 is defined as a periodic octet truss structure. In every case, each given slice is defined to place material at the precise locations needed to additively build up the plurality of struts. The slice pattern can become quite complex, resembling a plurality of oddly shaped spots or cross-sectional regions distributed across the slice, as shown in FIG. 2.

To compute where to place the cross-sectional regions for each consecutive slice plane, the conventionally programmed processor attempts to convert the computer aided design (CAD) description of the lattice (e.g., cubes 12 and 14 in FIG. 1) into a manifold stereolithographic (STL) description of the part surface. Often this will be done by constrained Delaunay triangulation. The conventional process is highly inefficient because the typical lattice structure can consist of thousands or even millions of individual strut members, often represented as prisms or cylinders. These must be merged into a manifold surface.

For very large slender member structures this process of generating the manifold STL can be exceedingly computationally expensive. The process will either take an enormous amount of time to compute; or worse, the process will fail when the processor runs out of memory. Running out of memory is not unlikely because the memory requirements geometrically explode as the number of lattice struts increases.

Aside from being computationally inefficient, the STL triangulation technique has the additional disadvantage of losing precision. This is because triangulated representations of cylindrical members inherently lose some precision, as the smooth surface of the cylinder must be replaced by a faceted description. If an application requires high fidelity to the original cylindrical struts, the stereolithographic (STL) description requires a large number of triangles per strut. This tends to increase the amount of memory required to create the STL description and inflate the size of the final STL file.

SUMMARY

Taking a different approach, the processor of the disclosed apparatus and method implements a direct slicing technique that determines where material needs to be deposited at each slice to define a lattice, without computationally taxing Delaunay triangulation or other inefficient algorithms. The disclosed method starts with a minimal description of the part geometry, describing where the joints are located and how the struts are connected between them. To reduce computational burden, the disclosed method selectively culls out all struts that do not pass through a given slice, leaving only the remaining struts that pass through the slice. Then for those remaining struts, the method uses ray tracing to quickly generate slice data that describes which pixels in the two-dimensional slice need to be printed.

The disclosed technique not only reduces the computational burden but it can also take advantage of parallel processing—where each slice is computed by a separate parallel process. The resulting method is thus fast and easy to implement in parallel, meaning that even the processor in an ordinary personal computer can develop slice data for very large lattice structures.

According to one aspect, the disclosed apparatus generates lattice structure slices for additive manufacturing of object using a processor having associated non-transitory memory. The memory is programmed to define a graph data structure for storing data representing a plurality of elongated struts each having a predefined spatial position and orientation relative to a three-dimensional reference frame. The memory is further programmed to define a slice data structure for storing data representing spaced apart and parallel two-dimensional slices each passing through the three-dimensional reference frame, the slice data structure storing for each slice a grid comprising a plurality of pixels, each pixel representing a binary state indicating whether material is or is not added in performing additive manufacturing of an object.

The processor is programmed to populate the slice data structure by performing a ray tracing algorithm that detects for each pixel within a slice whether an elongated strut occupies space within that pixel, the processor performing said ray tracing algorithm using data stored in said graph data structure to ascertain the relationship between the plurality of elongated struts and the two-dimensional slice.

According to a further aspect, the apparatus is used in an additive manufacturing machine having a material deposition tool head that causes material to be deposited slice-by-slice in an additive manner using the information populated in the slice data structure by said processor. Additionally, the processor may be further programmed to perform a culling algorithm that, for each given slice, processes the data stored in the graph data structure in relation to the geometry of the spaced apart and parallel two-dimensional slices to exclude from the ray tracing algorithm elongated struts that do not pass through that given slice.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 4a illustrates intersecting struts on an edge of a macroscale shape, leaving a gap in the joint;

FIG. 4b illustrates how the gap may be filled with a sphere to ensure a good connection between the struts;

FIGS. 5a, 5b and 5c illustrate an exemplary workflow starting from 3D CAD geometry (FIG. 5a), converted to a tetrahedral finite element mesh (FIG. 5b) and transformed to a slender member (strut) structure (FIG. 5c);

DESCRIPTION OF THE PREFERRED EMBODIMENTS

Using Struts to Define Additive Manufactured Objects

The presently preferred embodiment implements a parallel numerical algorithm for quickly and efficiently creating build files for additively manufacturing processes describing the geometry of slender member or lattice structures. These structures consist of slender members called struts—often having cylindrical or prismatic geometry-connected at node locations called joints. Structurally, these types of slender member structures are highly efficient. Additive manufacturing processes can assemble these structures into complicated structural shapes. Typically slender member structures consist of thousands or millions of geometric primitives describing the struts. These types of lattice-based additive manufacturing techniques are ideal for manufacturing structural components designed for high stiffness and strength to weight ratios, such as in aerospace applications.

The Additive Manufacturing Process

Additively manufactured slender member structures reduce the weight of a component while maintaining an overall macroscale shape. Slender member structures, particularly periodic slender member lattices, can exhibit optimal structural stiffness and strength, especially when considering the effective density of the lattice material.

The additive manufacturing processes can assemble slender member structures out of a variety of materials—polymers, hollow metal tubes, solid metal, and ceramics; and with a range of strut length scales from nanometers to centimeters. Increasing attention has been devoted to the performance and manufacture of these materials in the literature but little towards how to efficiently generate and store descriptions of the geometry of such structures and on how to produce the build files required for manufacturing.

Figure 1:
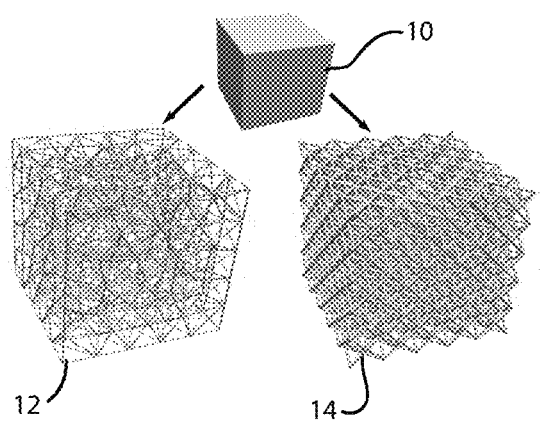
FIG. 1 illustrates how a cube may be defined as a lattice made up of a plurality of struts.

As noted above, periodic and aperiodic slender member structures pose special challenges for the conventional methods of generating the full 3D and sliced 2D geometries of additively manufactured components because of the large number of geometric primitives composing the part. FIG. 1 illustrates this difficulty—a macroscale shape described with a single cube 10 requires approximately 5,000 primitives to describe a lightweight slender member structure with the same macroscale geometry. These challenges will become more acute for larger components and as the scale separation between the size of the overall component and the size of individual struts increases.

As part of the manufacturing process 3D models of the geometry to be printed are sliced into sections perpendicular to the build surface. These 2D slices are then transformed to the machine instructions used to print the part layer-by-layer. For many additive manufacturing processes, including powder-bed and stereolithography methods, these 2D slices are ultimately bitmaps with the printed material white on a black background.

Processor Embodiment

Figure 3:
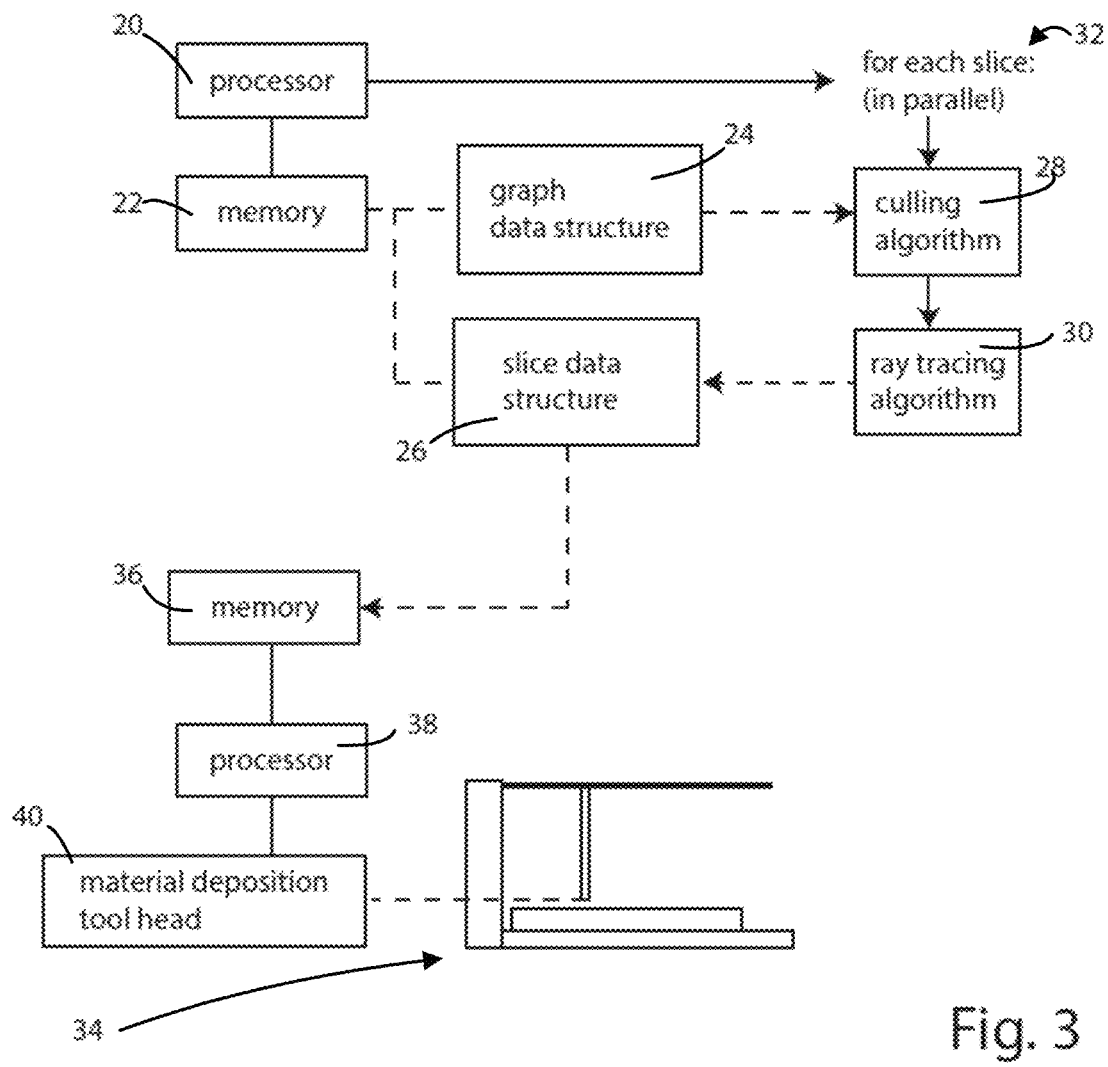
FIG. 3 is a block diagram of a processor-implemented tool for generating the slice data that is fed to the processor-implemented additive manufacturing machine to generate the part.

Shown in FIG. 3, the present direct slicing method is implemented using a specially programmed processor 20 having associated non-transitory memory 22. The memory 22 is configured to define a graph data structure 24, used to store data to define the three-dimensional position and cross sectional shape of each strut used to define the macroscale object. Thus with reference to FIG. 1, the graph data structure would store data describing the position and orientation of every strut (i.e., the struts making up the random tetrahedral structure 12 or the struts making up the periodic octet truss structure 14).

Figure 2:
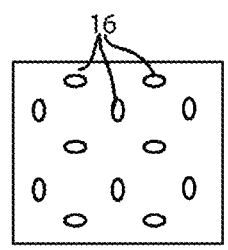
FIG. 2 illustrates an exemplary slice through the lattice cube of FIG. 1.

Memory 22 is also configured to define a slice data structure 26 that stores data describing which pixels within a given two-dimensional slice are to be populated with material. FIG. 2 illustrates this concept for a given slice, where the material boundaries at 16 illustrate where the material will be deposited for a given slice. The slice data structure defines each two-dimensional slice as a sequence of spaced apart parallel raster lines that are intersected at right angles by a sequence of parallel lines. The intersections of the raster and the right angle lines define pixels that store binary data indicating whether that pixel is or is not filled with material during the additive manufacturing process.

The processor is programmed to effect a series of algorithms, including a culling algorithm 28 that operates on data stored in the graph data structure 24, and identifies for exclusion all struts that do not pass through the two-dimensional plane of a given slice under consideration. Conversely, the culling algorithm identifies for inclusion, all struts that do pass through the two-dimensional plane of a given slice under consideration.

The goal of the culling algorithm is to exclude from consideration all struts that do not contribute material to the slice under consideration. The culling algorithm, while not required in all implementations, makes the overall operation far more efficient, because it eliminates the need to perform further processing on strut data that do not matter as far as the current slice is concerned.

As illustrated at 32, the processor 20 may be programmed to perform the culling algorithm 28 and the subsequent ray tracing algorithm 30 separately for each slice. This separate processing may be performed either sequentially or in parallel. Processing in parallel has the considerable advantage of greatly reducing the overall processing time required to generate all of the slices that make up the macroscale object.

Once the unaffected strut data has been culled out, the ray tracing algorithm 30 processes the non-excluded graph data to populate the slice data structure 26. The processor 20 performs the ray tracing algorithm individually for each two-dimensional slice. Essentially the ray tracing algorithm sequentially traverses each of the rasters of the slice data structure, projecting a ray along the raster line to determine if that ray passes through any regions occupied by a strut (as represented in the graph data structure).

As the ray is projected across a given raster, the ray tracing algorithm assesses the state of each pixel traversed, assigning to it one of the following tristate values:

0—if the ray does not pass through a strut at that pixel location;

1—if the ray passes tangent to a strut at that pixel location; and

2—if the ray intersects a region occupied by strut at that pixel location. The algorithm considers a pixel as intersecting both where the ray enters the region occupied by the strut and where the ray exits the region occupied by the strut.

The ray tracing algorithm populates the slice data structure to record which pixels are to be switched from the empty (no material deposit) state to the full (material deposit) state. If the tristate value of a pixel is either 0 or 1, the pixel is not changed to the full state. If the tristate value of a pixel is 2, that pixel is switched to a full state. In addition, for solid strut members, all pixels that fall on the raster line between the entry and exit intersection pixels are also switched to the full state.

To utilize parallel processing, a different processing thread can be assigned to each slice, and the threads can be processed in parallel. Once a given slice is populated in this fashion by ray tracing all of the rasters for that slice, the processing thread for that slice is complete. The processor 20 can then terminate that processing thread and utilize its computation resources on other tasks.

In this way, the ray tracing algorithm 30 populates the slice data structure 26 with the precise information needed by the additive manufacturing machine to "print" strut material for each successive slice.

To perform the actual manufacturing process, the data generated and stored in the slice data structure 26 by processor 20 is transferred to the additive manufacturing machine 34. Typically this is done by copying the data stored in slice data structure 26 to the memory 36 of the machine 34, where the processor 38 of the machine may operate upon it. Alternatively, the additive manufacturing machine 34 may employ dual ported memory, allowing it to read directly from the slice data structure data in memory 22.

The processor 38 of the additive manufacturing machine 34 reads the slice data in memory 36, using it as a recipe to control whether the material deposition tool head 40 does or does not deposit material at a given tool head position. The processor 38 can be programmed to follow a raster scan pattern, analogous to that used to generate the slice data structure, or it may be programmed to follow a different pattern, if desired. In either case, the slice data dictates whether material is deposited at a particular position of the tool head or not.

With this overview of the overall process in mind, a more detailed explanation of the applicable data structures and algorithms will now be presented.

Describing Slender Member Structures—Graph Data Structure

Provided all the struts in a structure have simple cross sections, storing the full 3D geometry of a slender member structure is inefficient compared to storing a compressed description only giving the positions of the joints, the connectivities of the struts, and a compact description of the cross section of each strut. A graph is the presently preferred data structure for this method of storage. In this description the coordinates of the joints are stored as vertex data, the graph connectivity describes the strut positions, and edge datasets describe the shape of each strut cross section. For circular cross sections a single edge variable—the radius of the strut—sufficiently describes the cross-section geometry. This storage scheme requires O (j+e) memory, with j the number of joints in the structure and e the number of struts.

In one preferred implementation the graph-based storage for slender member structures may be implemented using the NetCDF interface. NetCDF is a filetype for storing machine-independent binary scientific data. NetCDF stores data as dimensions, variables and attributes. Variables are data arrays with sizes given by dimensions. Attributes are data, generally metadata, attached to variables or to the NetCDF file itself.

Table A.1 lists the global attributes of the preferred implementation. Table A.2 lists the dimensions, and Table A.3 lists the variables contained in the NetCDF file along with a description of each. The "strut types" variable stores a code describing the geometry of each strut. These codes determine the shape of the cross section and also which edge data sets to reference to determine the cross section size. The implementation used to generate the examples in this disclosure requires only a single type code: 0, coding a circular cross section. Code 0 only refers to a single edge data set called "radii" giving the radius of each strut. Of course more complex cross sections are also possible As an example, a reasonable extension could use strut type 1 to describe struts with regular polygonal cross sections. Type code 1 would refer to two edge data sets: "radii" giving the strut radius and "n_edges" giving the number of edges for the polygonal cross section. The strut data set mechanism can also implement multi-material structures by adding a data set "material" coding the material type for each strut.

TABLE A.1

Globabl attributes attached to the NetCDF file description

| Attribute name | Description |
| --- | --- |
| Title | A title describing the structure described by the file |

TABLE A.2

Dimensions describing the size of the slender member structure

| Dimension name | Description |
| --- | --- |
| n_joints | Number of joints in the structure, equal to the number of vertices in the graph-based description |
| n_struts | Number of struts in the structure, equal to the number of edges in the graph-based description |
| dim | Problem dimension: 3 for 3D or 2 for 2D |
| ncon | Always equal to 2 |

TABLE A.3

Variables containing the data describing the structure geometry

| Variable name | Variable size | Description |
| --- | --- | --- |
| joints | n_joints × dim | Joint positions, vertex data |
| struts | n_struts × nconn | Strut connectivity, equivalent to the graph connectivity |
| strut_types | n_struts | Integer code describing each strut's cross-sectional shape, edge data |
| radii | n_struts | Edge data array used to describe the geometry of each strut |
| . . . | n_struts | Additional edge data sets required to describe strut geometry |

Storing the geometry of a slender member structure with this scheme vastly reduces the memory required to store the part geometry when compared to conventional CAD descriptions. The graph scheme might at first blush appear to have two disadvantages relative to a CAD description: 1) the graph-based method stores the unmerged geometry of the part, which will contain overlaps at the joints and 2) a simple, strut-only description can leave gaps in the 3D geometry, particular on boundaries of the part (see FIG. 4a). However, as explained below a direct slicing algorithm for these structures does not require a merged geometry. Furthermore, the gaps in the strut-based description can be filled in with spheres positioned at each joint (see FIG. 4b). The joint coordinates, already stored in the graph-based description, give the position of these spheres and their radii can be calculated on the fly with the formula $$r_i^{(n)} = \max r_j^{(e)} \forall j \in E_i$$

where $r_i^{(n)}$ is the radius of nodal spheres i, $r_j^{(e)}$ are the strut radii, stored as edge data, and $E_i$ is the set of all struts connected to joint i. This graph-based storage scheme compactly stores a complete description of a slender member structure.

The graph data structure provides the necessary information to manipulate many of the geometric properties of the slender structure—adding and removing struts, scaling and translating the structure, and altering the strut cross sections. However, the storage scheme does not provide useful information about the macroscale shape filled with strut material. For example, there is no easy way to reconstruct the macroscale shape of a part from its slender member graph description. Finite element meshing programs provide a pragmatic way to manipulate the macroscale shape of slender member structures.

Figure 8:
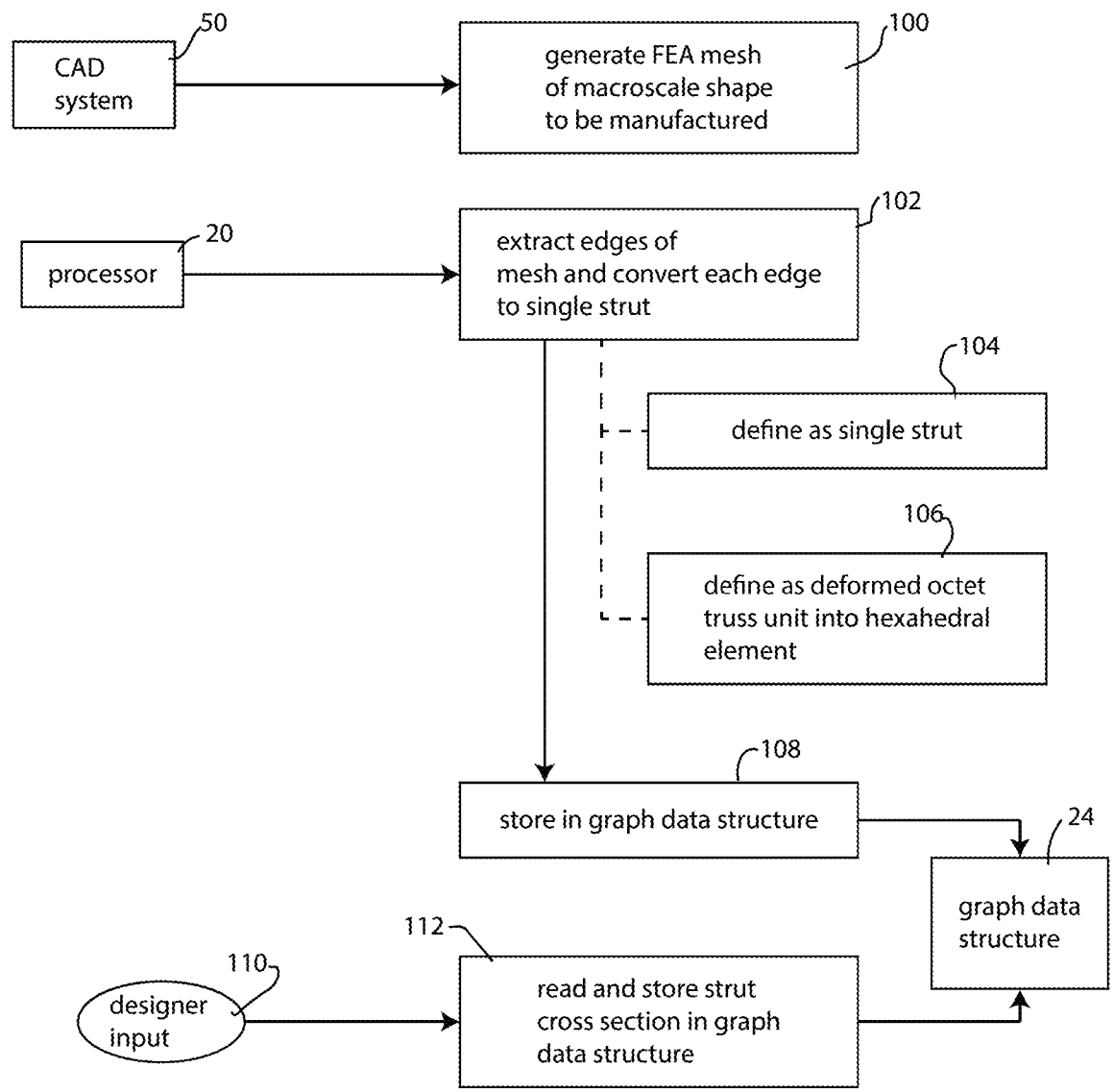
FIG. 8 is a detailed flowchart of the disclosed strut model generation, graph data structure population, culling and slicing algorithms.

FIG. 8 provides a flowchart of an exemplary technique for populating the graph data structure 24. Reference may also be had to FIGS. 5a-5c, which show how a desired object is constructed first as CAD data, and ultimately represented as struts stored in the graph data structure.

The process begins using the CAD system 50 (FIG. 8) to generate the macroscale shape of the object to be manufactured and produce a finite element solid mesh—for example the rocket object shown in FIG. 5a. A suitable CAD system for this purpose may include the finite element preprocessing program CUBIT developed by Sandia National Laboratories. Finite element preprocessors are often full-featured CAD environments. Using the CAD environment a designer can form the macroscale shape of the structure (FIG. 5a). Then, using methods provided by the preprocessor, the designer fills the macroscale shape with finite elements of a desired type—here tetrahedrons (FIG. 5b). Next, a program extracts the edges of the finite element mesh and converts these edges into struts, storing the results in the graph data structure described previously.

The processor 20 then operates on that CAD-designed macroscale shape by extracting edges of the mesh and converting each edge into a single strut, as at step 102. There are at least two possibilities for converting elements in the mesh to struts: 1) convert each edge of the mesh into a single strut in the structure (shown at step 104 and featured in FIG. 5b) or 2) convert each element into an approximately-conforming unit cell of struts—for example, embed a deformed octet truss unit cell into a hexahedral element, shown in step 106.

As struts are created, they are stored in the graph data structure 24, as indicated by step 108. As the designer establishes the desired strut configurations, he or she must also specify or select the cross section of the struts and their size, perhaps to achieve a target relative density. This is depicted by step 112. Finally, the finished structure ready to be sliced by the direct slicing algorithm described in the next section with reference to FIG. 9.

Direct Slicing Algorithm

This section describes the direct slicing algorithm to convert a slender member structure, defined with the graph data structure discussed in the ie-previous section, into a series of parallel slices represented as bitmap images. The additive manufacturing machine and associated software in turn takes this image stack as the build files required to produce the printed part. The slicing algorithm should be as computationally efficient as possible, both in terms of processing time and memory use, in order to allow processing large structures on ordinary personal computers.

Figure 6:
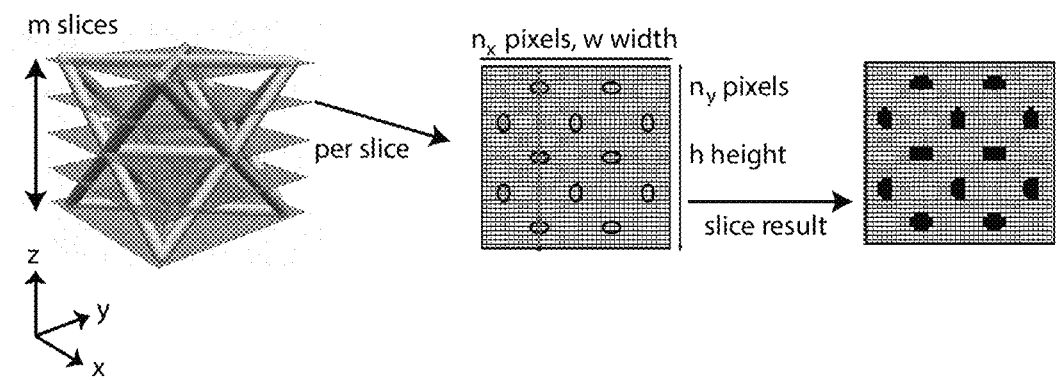
FIG. 6 diagrammatically summarizes the ray casting steps in the slicing algorithm.
Figure 9:
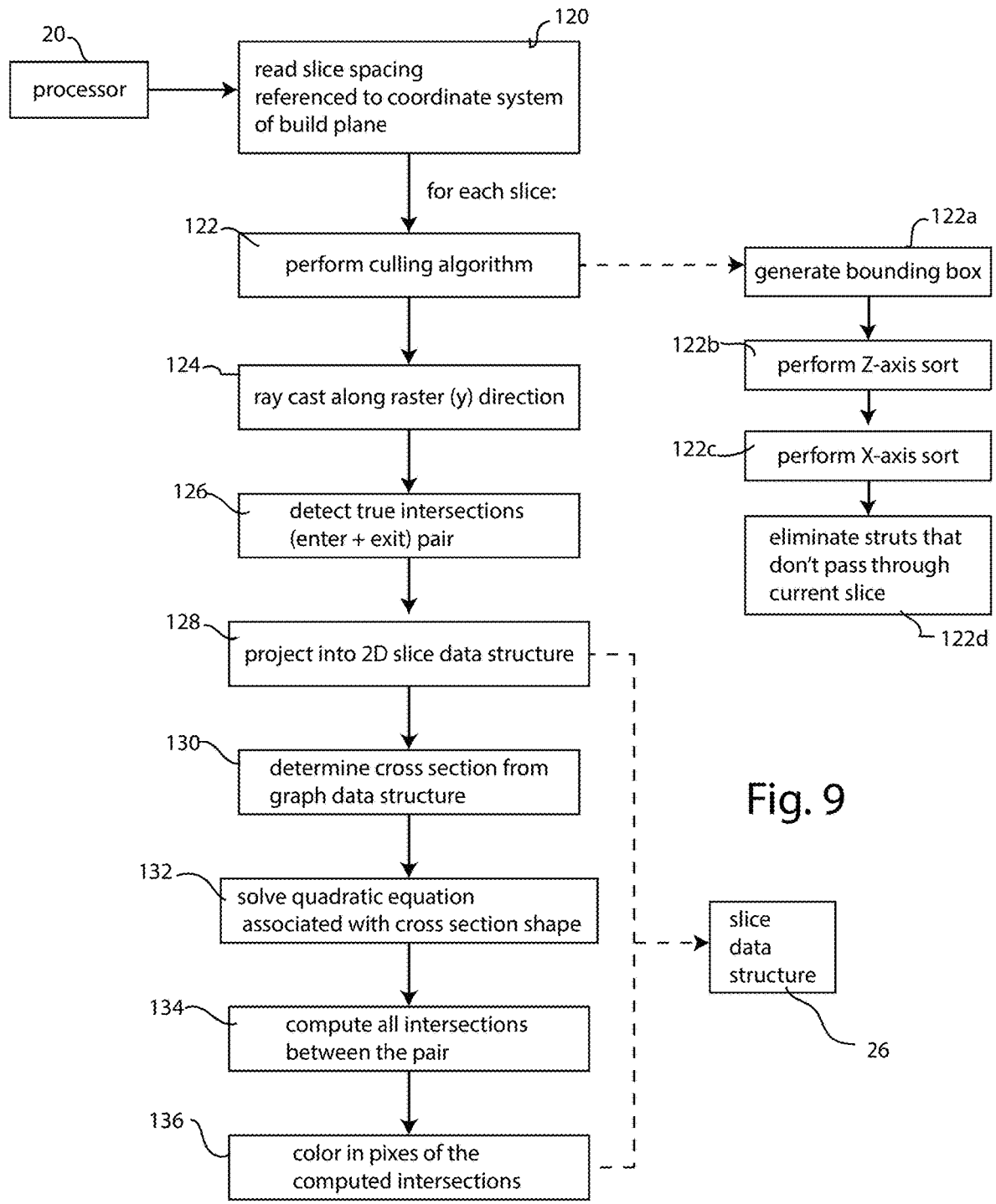
FIG. 9 is a detailed flowchart of the disclosed graph data structure population, culling and slicing algorithms.

FIG. 6 describes the kernel of the algorithm used to slice the 3D lattice structures: ray tracing to compute intersection points with multiple joints and struts along a single ray. Reference may also be had to FIG. 9, which illustrates the steps performed by processor 20 in effecting the culling and ray tracing algorithms.

First, as indicated at step 120 (FIG. 9) the slice spacing determines the plane of each slice as a distance from the build plane. The processor thus reads the slice spacing data from a stored location in memory. To reduce the computational burden, the processor 20 performs the culling algorithm as at step 122. The details of the culling algorithm will be provided below.

For each of these slices the ray tracing method casts rays along each line of pixels, as at step 124, to determine intersections with the geometric primitives—the prisms defining the struts and the spheres filling in the joints. Unlike ray tracing algorithms used in applications like 3D visualization, the ray tracing routine here returns both points of intersection with the primitives, not just the closest intersection to the ray point. This is indicated at step 126. For both spheres and cylinders a ray can intersect the shape at either zero (a miss), one (tangent), or two (intersection) points. Only true intersections—two points—will result in a projection onto the 2D slice plane (step 128) so the method only considers the final case. For both cylinders and spheres solving a quadratic equation governs the cost of computing the intersections.

The particular quadratic equation to solve depends on the geometry of the primitive. A ray can be parameterized as $$x = vt + pi \quad t \geq 0 \qquad \text{Eq. (1)}$$

with v a direction vector and p a start point. In this application the cast rays all have the same v and the start points pi are spaced along the center of each line of pixels (see FIG. 6). A sphere can be parameterized by the equation $$0 = (x-c) \cdot (x-c) - r^2 \qquad \text{Eq. (2)}$$

with c the sphere center and r the radius. The ray tracing algorithm solves the quadratic equation resulting from substituting Eq. 1 into Eq. 2

$$0 = (v \cdot v)t^2 + 2v \cdot (pi-c)t + (pi-c) \cdot (pi-c) - r^2 \qquad \text{Eq. (3)}$$

for t, the points of intersection given as distances from pi along v. Solving the cylinder-ray intersection problem requires solving a similar quadratic equation for the intersection of a ray with an infinite cylinder, checks to ensure these points are within the caps of the finite cylinder, solving two linear equations for the intersection of the ray with the finite cylinder cap planes, checks to ensure these points are inside the circular caps, and a sort to determine which points are nearest along the ray. In the implementation all ray tracing operations are vectorized so that the routines sequentially compute all intersections for a given line of pixels with all the geometric primitives of a given type.

For each line of pixels the ray tracing subroutine produces a set of pairs of values describing the distance along the ray to the two intersection points, one pair for each intersection. These intersection pairs are determined (step 134) by solving the quadratic equation associated with the cross sectional shape of the strut, as indicated at steps 130 and 132. The method scales the magnitude of the vector v so that $$\|v\| = \frac{h}{n_y} \qquad \text{Eq. (4)}$$

with h the height of the build plane and $n_y$ the number of pixels in the y-direction (see FIG. 6). The pairs describing the intersection points are then in units of pixels. The final step of the algorithm colors the pixels between each point in the pair white (indicating that pixel does provide additive manufacturing material when the AM process is run)—repeating this step for each intersection pair. This step is indicated at 136. Where the geometry of the slender structure overlaps at the joints the algorithm harmlessly colors the same pixels more than once. When repeated for each line of pixels and for each slice the result is a stack of images coloring the intersection of each plane with the 3D geometry. Steps 128-136 thus result in population of the slice data structure 26. All of the steps illustrated in FIG. 9 can be performed in parallel. In other words, all slices may be computed concurrently by using parallel processing techniques where each slice (or even each ray tracing ray) are launched as independent processing threads.

In practice, the implementation does not consider the intersection of all primitives with each ray. Thus shown in FIG. 9 at steps 122*a*-122*d*, a culling algorithm may be performed. In that algorithm, the primitives are sorted by their bounding boxes (generated at step 122*a*) so that each plane only considers the set of shapes that it could potentially intersect and each line of pixels likewise considers only the corresponding set of possible shapes (step 122*d*). These bounding box culls are done via insertion sorting the bounding line segments of all the primitives along the directions of interest—z for the plane sort (step 122*b*) and x for the pixel line sort (step 122*c*) (see also FIG. 6).

This bounding box sort step allows each plane, and in fact each ray, to be cast in parallel, independently of all the others. The implementation applies this parallelism only for planes—so it computes each slice in the image stack in parallel. This results in a highly efficient parallel algorithm, as it requires no communication between the processes handling each slice, provided the implementation duplicates the graph describing the structure geometry across all parallel processes.

To analyze the cost of the algorithm consider a case where each line of pixels could intercept f and each slice could intersect g cylindrical struts, as determined by a bounding box sort. A full analysis could consider the cost of the joint spheres separately from the cost of the strut cylinders however typically for these structures j<<e and so the cost of processing the joints will be dominated by the cost of processing the struts.

Given this description, the ray tracing operation for a single line of pixels requires O(f) floating point operations. The algorithm carries out this process for each of $n_x$ lines of pixels and each of m planes, in parallel using p processes. The overall cost of the ray casting is then $$T_{cost} = O\left(\frac{fn_xm}{p}\right) \qquad \text{Eq. (5)}$$

Each bounding box sorting operation requires O (k log s+kq) operations with k the number of primitives to sort, s the number of divisions (slices or pixel lines), and q the number of primitives per division. Assuming each division contains relatively few primitives q<<log s. The cost of sorting the primitives for each pixel line, done in parallel for each slice, is then $$T_{lines} = O\left(\frac{mg\log n_x}{p}\right) \qquad \text{Eq. (6)}$$

and the cost of the serial sort for the slices is $$T_{slice} = O(e \log m) \qquad \text{Eq. (7)}$$

The total computational cost of the algorithm is then $$T_{lines} = O\left(e\log m + \frac{mg\log n_x}{p} + \frac{fn_xm}{p}\right) \qquad \text{Eq. (8)}$$

Because e<mg<$fn_x$m—each strut will intersect multiple planes and each strut in a plane will intersect multiple pixel lines—in the serial case (p=1) the cost of the ray casting operation dominates the algorithm. In terms of memory use the insertion sorts used to implement the bounding box cull require only O (sq+k) additional memory, so the overall memory cost of the algorithm scales as $$M = O(e), \qquad \text{Eq. (9)}$$

linear with the number of struts. The current implementation duplicates all data structures naively across the p processes, but a more efficient implementation could only distribute the data each slice requires and, assuming again a uniform distribution of struts across the slices, preserve the linear scaling with the number of struts so that the memory use would scale as M=O (pmg), divided among p processes.

Examples and Discussion

Comparison to STL Based Methods

Figure 7:
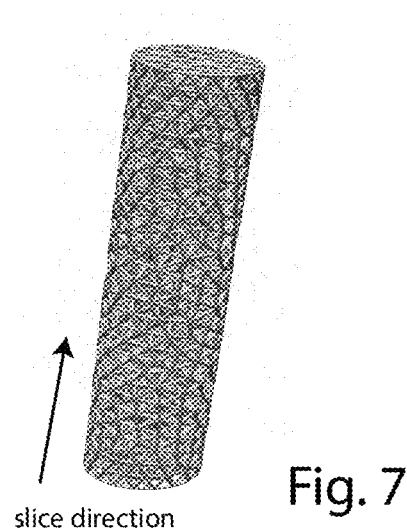
FIG. 7 is an exemplary cylinder filled with tetrahedra, useful in comparing the disclosed slicing method to the prior art.

FIG. 7 shows the small structure used in this section to compare the standard STL intermediate process to the method proposed in this work. The structure has 4,491 struts and 806 joints. The standard processes requires converting the CAD geometry of the part to an STL file and then slicing the STL file into the 2D image deck. This example uses the open source software OpenSCAD to convert CAD geometry to STL and then the open source program Slic3r to convert the STL into slices. OpenSCAD uses the CGAL library to construct the solid geometry and render STL files. The CAD geometry input to OpenSCAD matches the geometric description input to the slicing algorithm described in this work: a series of cylinders representing the struts and spheres to fill in gaps in the joints. The STL file replaces the smooth cylinders

TABLE 1

| Algorithm | Wall clock time (min.) | Est. peak memory use (MB) |
|---|---|---|
| STL | 82.1 | 4620 |
| Present algorithm - serial | 1.06 | 75.6 |
| Present algorithm - parallel | 0.313 | 303 | and spheres with faceted approximations. OpenSCAD was allowed to use a fairly coarse representation, replacing cylinders with regular octagonal prisms and spheres with icosahedrons.

Table 1 compares the cost—in terms of both memory use and time—of performing the slices with the conventional STL process and the algorithm described here in serial and with four parallel processes. All runs were conducted on a MacBook Pro with an Intel Core i7 processor with 4 cores and 8 GB of memory. The cost of slicing the STL with Slic3r is small compared to the cost of generating the STL file with OpenSCAD so for the STL method the table neglects the slicing cost.

The method disclosed here is much more efficient than the conventional process both in terms of CPU time and memory use. It is possible that other programs implement the constructive solid geometry algorithms used to merge the strut cylinders and joint spheres into a single solid solid and render the surface with triangles more efficiently than OpenSCAD. This would reduce the required CPU time for the STL rendering. However, the method disclosed here will likely always outperform competitors in terms of memory use as it as it essentially only requires as much memory as is necessary to store a compact description of the geometry itself. Memory use is an important metric for users that only have access to a personal computer. A CPU intensive algorithm will eventually produce the slices, given sufficient time, however a memory intensive algorithm can run out of available system memory and fail to complete the slice operation.

Computational Efficiency

TABLE 2

| | | | Wall clock time(s) for p processes | | | | |
|---|---|---|---|---|---|---|---|
| a | e | m | 1 | 2 | 4 | 8 | 16 |
| 1 | 36 | 100 | 30.8 | 17.9 | 9.7 | 6.2 | 5.0 |
| 2 | 240 | 200 | 59.2 | 35.0 | 17.8 | 10.1 | 7.6 |
| 4 | 1728 | 400 | 130.3 | 71.7 | 36.1 | 19.8 | 12.1 |
| 8 | 13056 | 800 | 349.6 | 195.8 | 95.4 | 50.9 | 30.9 |
| 16 | 101376 | 1600 | 1898.1 | 812.9 | 458.9 | 412.2 | 402.2 |

TABLE 3

| | | | Speedup/efficiency for p processes | | | | |
|---|---|---|---|---|---|---|---|
| a | e | m | 1 | 2 | 4 | 8 | 16 |
| 1 | 36 | 100 | 1.0/1.0 | 1.7/0.85 | 3.2/0.8 | 5.0/0.63 | 6.2/0.39 |
| 2 | 240 | 200 | 1.0/1.0 | 1.7/0.85 | 3.3/0.83 | 5.9/0.74 | 7.8/0.49 |
| 4 | 1728 | 400 | 1.0/1.0 | 1.8/0.9 | 3.6/0.9 | 6.6/0.83 | 10.8/0.68 |
| 8 | 13056 | 800 | 1.0/1.0 | 1.8/0.9 | 3.7/0.93 | 6.9/0.86 | 11.3/0.71 |
| 16 | 101376 | 1600 | 1.0/1.0 | 2.3/1.15 | 4.1/1.0 | 4.6/0.58 | 4.7/0.29 |

Tables 2 and 3 demonstrate the cost and parallel scaling of the algorithm applied to a set of example problems consisting of tiled arrays of octet truss unit cells (see FIG. 1b for an example of a 8×8×8 array). These example problems were run on machine with two Intel® Xeon® E5-2680 v2 CPUs with 10 cores each for a total of 20 available cores. For these examples a gives the number of unit cells along each edge of the cubic array, e the total number of struts in the geometry, and each trial run generates m slices. The number of slices was varied with a so that m~a. This scaling implies that e~$a^3$ and from the previous performance estimates of the algorithm g~$a^2$ and f~a. The resolution of each slice images was fixed at 512×512 pixels. Substituting these relations into Eq. 8, the algorithm should scale as:

$$T = O\left(a^3 \log a + \frac{a^2 \log n_x}{p} + \frac{a^2 n_x}{p}\right) = O(a^3 \log a) \quad \text{Eq. (10)}$$

So for large problems the cost of the serial sort will dominate the algorithm.

Table 2 gives the wall clock times for each trial run and Table 3 gives the corresponding speedup and parallel efficiency calculation. The serial wallclock times show the algorithm approaching the expected scaling only for the largest run. The cost of the ray casting dominates the smaller problems. As Table 3 shows, the large serial fraction imposed by the initial presorting does eventually dominate the cost of the largest problem, limiting, by Amdahl's law, the amount of parallel speedup. A better implementation would replace the serial presort with a parallel version. Then the cost of the algorithm becomes $$T = O\left(\frac{e \log m}{p} + \frac{mg \log n_x}{p} + \frac{fn_x m}{p}\right) \quad \text{Eq. (11)}$$

and for this specific example $$T = O\left(\frac{a^3 \log a}{p}\right) \quad \text{Eq. (12)}$$

This would mitigate the lack of scalability caused by the serial sort.

A cache effect likely causes the superlinear speedup observed for the largest case. The implementation vectorizes the ray casting operations so it is beneficial if the entire problem can fit inside cache memory.

Increasing the number of processors and dividing the work evenly between them also increases the likelihood a ray cast operation will fit inside cache memory, an effect independent of the parallel scaling in terms of work per process.

Conclusions

For slender member structures the slicing algorithm developed here outperforms the conventional method of producing and then slicing an STS description of the part geometry. The present algorithm makes it possible to slice large slender member and lattice structures quickly on ordinary computers. As these types of structures go into engineering service as efficient light-weighting materials the resulting slender member structures will have large numbers of struts, requiring specialized storage methods and slicing algorithms like the ones described here.

Several direct extensions of the algorithm are possible. Differently shaped struts could be accommodated by extending the ray casting routine. Support for multi-material printing processes could be added by implementing a method of coloring the bitmaps—different colors could represent different materials. This coloring capability could also be used, with a slight modification to the algorithm, to generate slices for structures with hollow struts. First the method would color the outer section of the struts white, just as implemented above. Then a second pass would color the inside, hollow part of the members with the same algorithm but now coloring the hollow sections black. The resulting difference bitmap describes the hollow geometry.

If desired the algorithm can be adapted to better integrate the macroscale shape and slender member design processes by automatically regenerating suitable meshes respecting the physical limits of the various manufacturing processes in terms of minimum feature size and strut slenderness as the user changes the macroscale geometry. As disclosed here the process is iterative, giving the user the ability to change the settings of the finite element meshing method in order to control generation of a suitable mesh. Because the current direct slicing technique is so computationally efficient, it is well suited to study of the physical properties of the random tetrahedron slender member structures shown in FIG. 1 at 12 as compared with the properties of optimal periodic lattice materials shown in FIG. 1 at 14.

The foregoing description of the embodiments has been provided for purposes of illustration and description. It is not intended to be exhaustive or to limit the scope of the invention as set forth in the appended claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for generating lattice structure slices for additive manufacturing of objects, comprising:

a processor having associated memory;

the memory being programmed to define a graph data structure for storing data representing a plurality of elongated struts each having a predefined spatial position and orientation relative to a three-dimensional reference frame;

the memory being programmed to define a slice data structure for storing data representing spaced apart and parallel two-dimensional slices each passing through the three-dimensional reference frame, the slice data structure storing for each said slice a grid comprising raster lines and right angle lines, the intersections of which define a plurality of pixels of the slice, each said pixel representing a binary state indicating whether material is or is not added in performing additive manufacturing of an object;

the processor being programmed to populate the slice data structure by performing a ray tracing algorithm along at least one of the raster lines or the right angle lines, that separately examines each said pixel within a given said slice and detects, for each said pixel within a given said slice, whether any portion of an elongated strut of the lattice structure occupies space within a given said pixel, and for each line of pixels of the grid, the ray tracing algorithm creates a set of pairs of pixel values describing a distance along the ray to a pair of intersection points, one pair of pixel values for each intersection, the processor performing said ray tracing algorithm using data stored in said graph data structure to ascertain the relationship between the plurality of elongated struts and the two-dimensional slice;

wherein the results of the ray tracing algorithm are operable to control an additive manufacturing machine to print a 3D object; and an additive manufacturing machine having a material deposition tool head that causes material to be deposited slice-by-slice in an additive manner, using the data populated in the slice data structure by said processor, to print the 3D object.

2. The apparatus of claim 1 wherein the processor is further programmed to perform a culling algorithm that, for each given slice, processes the data stored in the graph data structure in relation to the geometry of the spaced apart and parallel two-dimensional slices to exclude from the ray tracing algorithm elongated struts that do not pass through the given said slice.

3. The apparatus of claim 1 wherein the processor is programmed to perform the ray tracing algorithm in parallel upon a plurality of slices.

4. The apparatus of claim 1 wherein the graph data structure defines each elongated strut by storing at least two points within the three-dimensional reference frame and at least one parameter defining the cross-sectional shape of the strut.

5. The apparatus of claim 1 wherein the processor is programmed to generate bounding boxes around primitive regions where each of the plurality of elongated struts passes through the given said slice and by then sorting bounding boxes with respect to at least one predefined direction to cull struts that do not pass through the given said slice.

6. The apparatus of claim 5 wherein the at least one predefined direction corresponds to an additive manufacturing build direction.

7. A method of generating lattice structure slices for additive manufacturing of objects, comprising:

populating a graph data structure implemented in a computer readable memory by storing data representing a plurality of elongated struts, each said elongated strut having a predefined spatial position and orientation relative to a three-dimensional reference frame; using a processor to access a memory storing a slice data structure to store data representing spaced apart and parallel two-dimensional slices each passing through the three-dimensional reference frame, the slice data structure being programmed to store for each slice a grid comprising raster lines and right angle lines, the intersections of which define a plurality of pixels of the slice, each said pixel representing a binary state indicating whether material is or is not added in performing additive manufacturing of an object;

using the processor to access the graph data structure and to perform ray tracing along at least one of the raster lines or the right angle lines, that separately examines each said pixel within a given said slice, and detects, for each said pixel within the given said slice, whether any portion of an elongated strut occupies space within a given said pixel of the given said slice, the processor performing said ray tracing using data stored in the graph data structure to ascertain the relationship between the plurality of elongated struts and the two-dimensional slice, and for each line of pixels of the grid, the ray tracing creates a set of pairs of pixel values describing a distance along the ray to a pair of intersection points, one pair of pixel values for each intersection; and wherein information determined from the ray tracing is configured to assist in controlling an additive manufacturing printing operation to print a 3D object.

8. The method of claim 7 further comprising supplying data from the slice data structure to the additive manufacturing machine, wherein the additive manufacturing machine has a material deposition tool head that causes material to be deposited slice-by-slice in an additive manner using the data populated in the slice data structure by said processor.

9. The method of claim 7 further comprising using the processor to perform a culling algorithm that, for each given said slice, processes the data stored in the graph data structure in relation to the geometry of the spaced apart and parallel two-dimensional slices to exclude from the ray tracing algorithm elongated struts that do not pass through that given said slice.

10. The method of claim 7 wherein the processor performs the ray tracing algorithm in parallel upon a plurality of said slices.

11. The method of claim 7 wherein the graph data structure defines each elongated strut by storing at least two points within the three-dimensional reference frame and at least one parameter defining the cross-sectional shape of the strut.

12. The method of claim 7 further comprising using the processor to generate bounding boxes around the primitive regions where each of the plurality of elongated struts passes through a slice and by then sorting bounding boxes with respect to at least one predefined direction to cull struts that do not pass through a given said slice.

13. The method of claim 12 wherein the at least one predefined direction corresponds to an additive manufacturing build direction.

14. A non-transitory computer readable medium storing a program that when executed by a processor causes the processor to perform the steps of:

defining a graph data structure implemented in a computer readable memory, the graph data structure representing a plurality of elongated struts, each said elongated strut having a predefined spatial position and orientation relative to a three-dimensional reference frame;

defining in said computer readable memory a slice data structure, the slice data structure relating to data representing spaced apart and parallel two-dimensional slices each passing through the three-dimensional reference frame, the slice data structure storing for each slice a grid comprising raster lines and right angle lines, the intersections of which define a plurality of pixels, each pixel representing a binary state indicating whether material is or is not added in performing additive manufacturing of an object;

accessing the graph data structure and performing ray tracing along at least one of the raster lines or the right angle lines, that separately examines each said pixel of a given said slice and detects, for each said pixel within a given said slice, whether any portion of an elongated strut occupies space within the given said pixel, the processor performing said ray tracing using data stored in the graph data structure to ascertain the relationship between the plurality of elongated struts and the two-dimensional slice, and for each line of pixels of the grid, the ray tracing creates a set of pairs of pixel values describing a distance along the ray to a pair of intersection points, one pair of pixel values for each intersection; and using information generated from the ray tracing to control an additive manufacturing machine to print a 3D object.

15. The non-transitory computer readable medium of claim 14 storing a program that when executed by a processor causes the processor to perform the further step of:

supplying data from the slice data structure to the additive manufacturing machine, wherein the additive manufacturing machine has a material deposition tool head that causes material to be deposited slice-by-slice in an additive manner using the data populated in the slice data structure by said processor.

16. The non-transitory computer readable medium of claim 14 storing a program that when executed by a processor causes the processor to perform the further step of:

performing a culling algorithm that, for each given slice, processes the data stored in the graph data structure in relation to the geometry of the spaced apart and parallel two-dimensional slices to exclude from the ray tracing elongated struts that do not pass through the given slice.

17. The non-transitory computer readable medium of claim 14 wherein the graph data structure defines each elongated strut by storing at least two points within the three-dimensional reference frame and at least one parameter defining the cross-sectional shape of the strut.

18. The non-transitory computer readable medium of claim 14 storing a program that when executed by a processor causes the processor to perform the further step of:

generating bounding boxes around the primitive regions where each of the plurality of elongated struts passes through a slice, and sorting bounding boxes with respect to at least one predefined direction to cull struts that do not pass through a given slice.

19. The non-transitory computer readable medium of claim 18 wherein the at least one predefined direction corresponds to an additive manufacturing build direction.

* * * * *